United States Patent Office 3,441,313
Patented Apr. 29, 1969

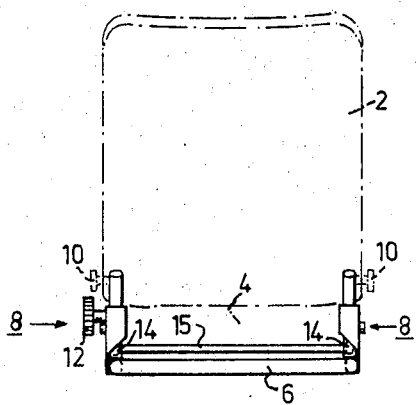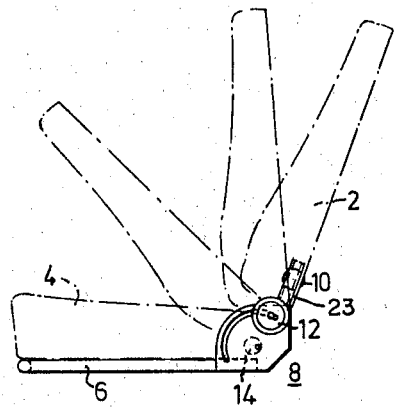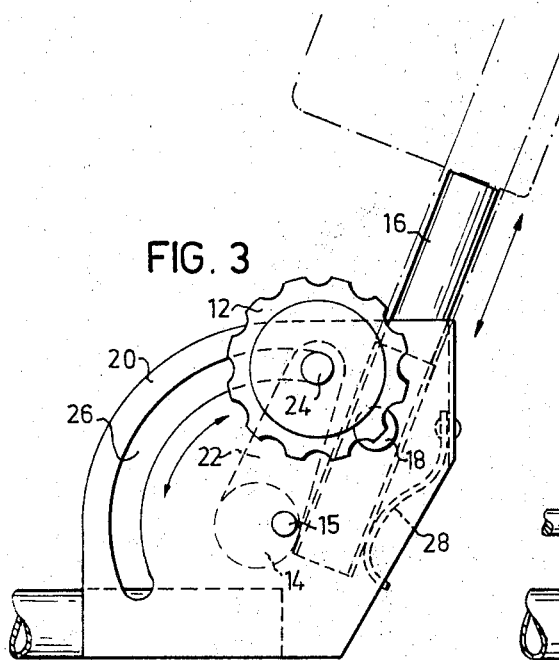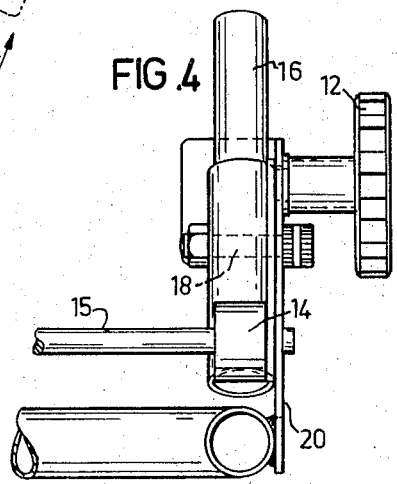

3,441,313
MECHANISM FOR ADJUSTING THE BACKREST OF SEATS IN VEHICLES
Bror Gothe Persson, Idrottsvagen 5,
Oskarshamn, Sweden
Filed Apr. 27, 1967, Ser. No. 634,176
Claims priority, application Sweden, May 5, 1966,
6,195/66
Int. Cl. B60n 1/02, 1/06
U.S. Cl. 297—374                                  1 Claim

ABSTRACT OF THE DISCLOSURE

This invention discloses a mechanism for adjusting the inclination of the backrest of a seat in a vehicle by means of a cam device.

According to the invention a mechanism is provided which permits quick and continuous adjustment of the inclination of the backrest by a simple hand movement so that the backrest will fit each individual person. This is attained by using an eccentric which cooperates with a lower extension member from the backrest and which is lockable in any desired angular position.

---

This invention relates to a mechanism for adjusting the inclination of the backrest of a seat in a vehicle, comprising a cam device for cooperation with at least one extension member pivotally mounted in the support or the like of the seat and extending downwardly from the frame or the like of the backrest.

In prior-art constructions the backrest of the seat is adjusted step by step. The object of this invention is to provide a mechanism which permits quick and continuous adjustment of the inclination of the backrest by a simple hand movement so that the backrest will fit each individual person.

In accordance with the invention this object is attained due to the fact that the cam device comprises an eccentric which is mounted for revolving in the support of the seat ahead of and at a lower level than said extension member and lockable in any desired angular position, said eccentric permitting in a certain angular position free forward turning of the backrest or forward turning against the action of a spring device. A preferred embodiment of the invention is characterized by an arm secured to the eccentric at right angles to the shaft of the eccentric, the end of the arm remote from the eccentric carrying a pin which extends at right angles from the arm and is adapted to be moved in an arc-shaped slot in a plate which is parallel to the arm and secured to the support of the seat, said pin being lockable to said plate in any desired position. Advantageously, two eccentrics disposed one on either side of the seat are adapted to act upon an appertaining element in the form of a tube or bar, which element extends from the lower edge of the backrest. Said element may slidably fit in a corresponding sleeve in the backrest and is lockable therein in any desired position. As a result the backrest can also be adjusted vertically so as to fit the small of the back of the person sitting on the cushion.

The invention will now be described more closely with reference to the annexed drawing in which FIG. 1 is a diagrammatic rear view of a vehicle seat provided with a mechanism according to the invention, FIG. 2 is a lateral elevation of this seat, FIG. 3 is an enlarged lateral elevation of an embodiment of the mechanism according to the invention, and FIG. 4 is an enlarged front view thereof.

The seat illustrated in FIG. 1 comprises a backrest 2 and a seat cushion 4. The cushion 4 rests on a simple support generally indicated at 6. Backrest adjusting mechanisms generally denoted at 8 are located one on either side below the backrest 2. They comprise knobs or hand wheels 10 disposed on either side of the seat and adapted to lock the backrest in any desired vertical position. Numeral 12 denotes a knob for locking the backrest in a desired position of inclination. Provided on either side below the backrest is an eccentric 14. These eccentrics are interconnected by a common shaft 15.

FIGS. 3 and 4 are enlarged views of the adjusting mechanism according to the invention. Extending from the lower side of the backrest are tubes or bars 16 located one on either side of the seat and disposed adjacent the lateral edges of the backrest and in the plane thereof. As diagrammatically indicated at 18 the tubes 16 are mounted on individual pivots each of which extends through a plate member 20 secured to the support and extending upwardly therefrom. The tubes are displaceable in corresponding sleeves 23 in the backrest and can be locked in the sleeves in desired positions by means of the knobs 10. Also mounted in the two plates 20 is the eccentric shaft 15 on which the eccentrics 14 are located near the plates 20 and opposite to the tubes 16 which all the time are in engagement with the surfaces of the eccentrics and can be turned about the pivots 18 upon turning movement of the eccentrics about the shaft 15.

On the side of the seat shown in FIGS. 3 and 4 the respective eccentric 14 is provided with an arm 22 which at its end remote from the eccentric has a threaded pin 24 which can be moved in an arc-shaped slot 26 in the plate 20 and locked thereto in any desired position in a conventional manner by means of the knob 12 which is screwed onto the pin. It will be obvious from the drawing that if the pin 24 is moved by the knob 12 into a selected position in the slot 26, the desired inclination of the backrest will be obtained due to the action of the eccentric 14 on the tube 16 pivotally mounted at 18. By moving the backrest to a desired position on the tubes 16 and locking it by means of the knobs 10 the backrest can be brought to fit the small of the back of the person sitting on the cushion. A spring 28 counteracts the movement of the tube 16.

What I claim is:

1. An adjusting mechanism for adjusting the backrest of a seat supported in a motor vehicle, said backrest having a frame, which comprises two eccentrics, one on either side of the seat and co-operating with extension members one for each eccentric which extension members are pivotally mounted in the support of the seat and extend downwardly from the frame of the backrest, said eccentrics being provided with shafts and being mounted for revolution in the support of the seat ahead of said extension members by means of arms one for each eccentric and secured to the eccentric substantially at right angles to said shaft of the eccentric, the end of each arm remote from the eccentric carrying a pin extending substantially at right angles from the arm and adapted to be moved in an arc-shaped slot in a plate extending near, and parallel, to the arm and secured to the support of the seat, at least one of said pins being lockable to said plate in any desired position, each of said extension members being in the form of a tube or bar slidably fitting in a corresponding sleeve in the backrest and lockable therein in any desired position.

References Cited

UNITED STATES PATENTS

| | | | |
|---|---|---|---|
| 2,635,679 | 4/1953 | McDonald | 297—252 |
| 2,638,150 | 4/1953 | May | 297—353 XR |
| 3,044,830 | 7/1962 | Kolle | 297—361 |
| 3,185,525 | 5/1965 | Welsh | 297—379 XR |
| 3,226,158 | 12/1965 | Strein et al. | 297—361 |
| 3,361,474 | 1/1968 | Kolle | 297—374 |

BOBBY R. GAY, *Primary Examiner.*

G. O. FINCH, *Assistant Examiner.*